United States Patent [19]
Chang

[11] Patent Number: 6,166,165
[45] Date of Patent: Dec. 26, 2000

[54] POLYURETHANE SYNTHESIS FROM FUNCTIONAL GROUP TERMINATED POLYMERS CONTAINING SULFONATE GROUPS

[75] Inventor: Wally L. Chang, Naperville, Ill.

[73] Assignee: Witco Corporation, Greenwich, Conn.

[21] Appl. No.: 08/768,660

[22] Filed: Dec. 18, 1996

[51] Int. Cl.[7] .................................................. C08G 18/10
[52] U.S. Cl. .............................. 528/60; 528/61; 528/65; 528/71; 528/75; 524/591; 524/840
[58] Field of Search ................................. 528/60, 61, 65, 528/71, 75; 524/591, 840

[56] References Cited

U.S. PATENT DOCUMENTS

| | | | |
|---|---|---|---|
| Re. 34,514 | 1/1994 | Wernet et al. | 252/500 |
| 2,475,886 | 7/1949 | Goebel et al. | 525/354 |
| 2,489,943 | 11/1949 | Wilson et al. | 524/748 |
| 3,102,893 | 9/1963 | Gaertner | 549/555 |
| 3,385,811 | 5/1968 | Carrington et al. | 528/294 |
| 3,860,638 | 1/1975 | Beach et al. | 562/103 |
| 3,879,450 | 4/1975 | Velker et al. | 562/110 |
| 3,978,262 | 8/1976 | Fritz et al. | 428/265 |
| 4,048,149 | 9/1977 | Fritz et al. | 560/90 |
| 4,056,564 | 11/1977 | Wolf et al. | 526/3 |
| 4,108,814 | 8/1978 | Reiff et al. | 524/840 |
| 4,123,423 | 10/1978 | Wenzel et al. | 528/71 |
| 4,186,118 | 1/1980 | Reischl et al. | 528/52 |
| 4,299,743 | 11/1981 | Pierce et al. | 528/293 |
| 4,304,900 | 12/1981 | O'Neill | 528/290 |
| 4,304,901 | 12/1981 | O'Neill et al. | 528/290 |
| 4,306,998 | 12/1981 | Wenzel et al. | 428/473 |
| 4,307,219 | 12/1981 | Larson | 528/71 |
| 4,525,524 | 6/1985 | Tung et al. | 524/601 |
| 4,528,323 | 7/1985 | Lorenz et al. | 524/839 |
| 4,746,717 | 5/1988 | Larson | 528/68 |
| 4,762,894 | 8/1988 | Fong et al. | 525/329.4 |
| 4,801,644 | 1/1989 | Coogan | 524/839 |
| 4,855,384 | 8/1989 | Larson | 528/60 |
| 4,880,898 | 11/1989 | Wahle et al. | 528/272 |
| 4,910,292 | 3/1990 | Blount | 528/272 |
| 4,946,932 | 8/1990 | Jenkins | 528/272 |
| 4,973,656 | 11/1990 | Blount | 528/272 |
| 4,990,593 | 2/1991 | Blount | 528/272 |
| 5,004,786 | 4/1991 | Fong et al. | 525/344 |
| 5,021,544 | 6/1991 | Padget et al. | 528/272 |
| 5,120,797 | 6/1992 | Fong et al. | 525/344 |
| 5,277,978 | 1/1994 | Feustal et al. | 428/402 |
| 5,281,630 | 1/1994 | Salsman | 521/48 |
| 5,281,650 | 1/1994 | Burk et al. | 524/430 |
| 5,334,690 | 8/1994 | Schafheutle et al. | 528/71 |
| 5,608,000 | 3/1997 | Duan et al. | 524/591 |
| 5,610,232 | 3/1997 | Duan et al. | 524/840 |
| 5,624,758 | 4/1997 | Maksymkiw et al. | 428/423.9 |
| 5,637,639 | 6/1997 | Duan et al. | 524/591 |
| 5,703,158 | 12/1997 | Duan et al. | 524/840 |
| 5,891,944 | 4/1999 | Fuestel et al. | 524/311 |

FOREIGN PATENT DOCUMENTS

| | | |
|---|---|---|
| 31567/77 | 6/1979 | Australia . |
| 1065095 | 10/1979 | Canada . |
| 0 225 596 | 6/1987 | European Pat. Off. . |
| 0 357 280 | 3/1990 | European Pat. Off. . |
| 0 548 705 A1 | 6/1993 | European Pat. Off. . |
| 548705 | 6/1993 | European Pat. Off. . |
| 25 06 156 | 8/1975 | Germany . |
| 39 39 918 A1 | 6/1991 | Germany . |
| 44 05 204 A1 | 8/1995 | Germany . |
| 44 23 352 A1 | 1/1996 | Germany . |
| 56-135547 | 10/1981 | Japan . |
| 1 418 975 | 12/1975 | United Kingdom . |
| 1 475 798 | 6/1977 | United Kingdom . |
| 1 499 138 | 1/1978 | United Kingdom . |
| 9428043 | 12/1994 | WIPO . |
| WO 95 08583 | 3/1995 | WIPO . |
| WO 96/01331 | 1/1996 | WIPO . |

OTHER PUBLICATIONS

Rosthauser & Nachtkamp; Waterborne Polyurethanes Journal of Coated Fabrics, vol. 16, pp. 39–79, Jul. 1986.

*Primary Examiner*—Rachel Gorr
*Attorney, Agent, or Firm*—Scully, Scott, Murphy & Presser

[57] ABSTRACT

Disclosed is a process for producing water-dispersible polyurethanes by forming an isocyanate-di-substituted prepolymer and reacting it with a chain extender. The prepolymer can be formed by reacting a diisocyanate with an ethylenically unsaturated precursor which is preferably formed by condensation polymerization of reactants including ethylenically unsaturated reactants and then sulfonating the ethylenic unsaturation of said polymeric precursor by reacting it with a sulfonating agent such as bisulfite, metabisulfite, or a mixture thereof.

26 Claims, No Drawings

POLYURETHANE SYNTHESIS FROM FUNCTIONAL GROUP TERMINATED POLYMERS CONTAINING SULFONATE GROUPS

BACKGROUND OF THE INVENTION

The present invention relates to water-dispersible polyurethane polymers, and more particularly to such products synthesized from water-dispersible polyesters.

Polyurethanes find use in a variety of applications, including coatings, paints, adhesives, and the manufacture of fibers and solid articles. Polyurethanes are typically soluble in organic solvents, and exhibit little if any solubility in aqueous solvents or in systems in which water and a second water-soluble solvent are employed. Organic solvent-based resin solutions have thus typically been the vehicle of choice for use in forming coatings and the like of polyurethanes. However, many organic solvents commonly used in conjunction with such resins present environmental problems associated with their toxicity. There has been a growing concern based on the effects of such organic solvents on the environment, as well as on the long-term health of individuals who come into contact with such solvents. There has, therefore, been a growing interest in the use of aqueous resin compositions as a means of eliminating toxicity problems associated with organic solvents, and as a means of complying with governmental edicts with respect to the use of such solvents.

Examples of aqueous polyurethane dispersions are known in the art. The dispersion of the polyurethane into the aqueous medium has customarily been achieved through the use of dispersing or emulsifying agents such as nonionic or ionic surfactants. However, the use of surfactant-stabilized aqueous resin dispersions is far from desirable, since a proportion of free surfactant can be carried through to the final product, which can result in a diminution of the desired properties of the final product.

The prior art has thus attempted to incorporate directly into the polyurethane polymer molecule moieties which afford greater water dispersibility to the polymer. Typically, these attempts involve reaction of a water-soluble or water-dispersible agent such as N-(2-aminoethyl)-2-aminoethane sulfonic acid, sodium salt, or an adduct of sodium bisulfite and 1,4-dihydroxy-butene(2), as a chain extender, with the already-formed di-capped isocyanate prepolymer, thereby to form the desired polymer molecule. Typical of this approach are disclosures in U.S. Pat. Nos. 4,108,814, 4,123,423, 4,186,118, 4,306,998 and 5,528,323.

This prior art approach to the objective of incorporating a water-dispersible moiety into the polyurethane molecule has drawbacks, such as the fact that a very high content e.g. up to 70% of a solvent such as acetone needs to be present to reduce the viscosity of the mixture.

It is thus an object of the present invention to provide an improved technique for forming water-dispersible polyurethanes, particularly those formed from water-dispersible polyesters, which technique affords improved ease of operation, more satisfactory yields, and offers a greater variety in the selection of reactants and in the range of properties of the products that can be obtained.

BRIEF SUMMARY OF THE INVENTION

One aspect of the present invention is a process for producing a water-dispersible polyurethane, comprising chain extending a sulfonate-substituted prepolymer which is substituted with at least two isocyanate groups.

A further aspect of the invention comprises forming the sulfonate-substituted prepolymer, which is substituted with at least two isocyanate groups, by reacting a sulfonate-substituted polyester, that is substituted with at least two hydroxyl groups, with a diisocyanate compound, generally at a mole ratio of at least 2:1 such that at least 2 hydroxyl groups on the polyester molecule react with isocyanate groups.

One specific method of forming the sulfonate-substituted polyester which is used in forming the water-dispersible polyurethane polymer in accordance with the present invention comprises forming an ethylenically unsaturated polyester precursor by condensation polymerization of reactants which upon said condensation polymerization form said polyester precursor which is substituted with at least two —OH groups, wherein at least one of said reactants contains ethylenic unsaturation; and sulfonating said polymeric precursor by reacting it with a sulfonating agent selected from the group consisting of bisulfites, metabisulfites, and mixtures thereof, under conditions such that said sulfonating agent reacts with said ethylenic unsaturation and sulfonates said polymeric precursor. The sulfonated, di-hydroxyl substituted, product is then reacted with diisocyanate and the product thereby formed is chain extended to make the final polyurethane product.

Another specific method of forming the sulfonate-substituted polyester which is used in forming the water-dispersible polyurethane polymer in accordance with the present invention comprises (a) sulfonating an ethylenically unsaturated monomeric precursor which has no aromatic ring and which is substituted with at least two groups selected from the group consisting of —OH, and —COOH, to form a sulfonated monomeric precursor; and (b) reacting said sulfonated monomeric precursor with a difunctional second monomer capable of undergoing condensation polymerization with said sulfonated monomeric precursor, under conditions whereunder said precursor and said second monomer undergo condensation polymerization to form a polyester.

Preferably, said sulfonation is carried out with a sulfonating agent selected from the group consisting of bisulfites, metabisulfites, and mixtures thereof, under conditions such that said sulfonating agent sulfonates said monomeric precursor by reaction at said ethylenic unsaturation.

Optionally, the monomeric precursor is simultaneously sulfonated and end-capped with a difunctional precursor to form a sulfonated, difunctional "dimer" which is capable of undergoing condensation polymerization in step (b).

DETAILED DESCRIPTION OF THE INVENTION

The present invention is useful in making water-dispersible polyurethanes. The products of the process of this invention can be used per se to form coatings, films and the like. The products of the process of this invention can also be used to fabricate solid articles, fibers, sheets, and other useful products.

A. Preparing the Sulfonate- and Hydroxyl-Substituted Polyester

1. Sulfonating an Ethylenically Unsaturated Polyester

One preferred manner of introducing sulfonate functionality into the reactants, a polyester is prepared which includes ethylenic unsaturation. The functionalities present on the reactants to form the polyester include one or both of —COOH (or anhydride) and/or —COH, and one or more —OH groups. The reactants that enter into such condensation reaction forming the polyester are substituted with two, or more, of such functionalities. More often, reactants are substituted with the same functionalities (e.g., diacids and diols) but they can be substituted with two or more different functionalities (e.g., hydroxyacids).

Preferred examples of condensation polymerization reactions to form polyesters include the reaction of, for instance, diols with dicarboxylic acids or anhydrides thereof. Condensation polymerization reactions also include such reactions of glycol or other polyols with a diacid or anhydride to form a polyester which has 2 or more than 2 free hydroxyl groups per molecule.

One essential aspect of the process of this embodiment of the present invention is that the polyester that is obtained contains ethylenic unsaturation, that is, one or more carbon-carbon double bonds, either in the main chain of the polymer, or pendant from the main chain of the polymer (connected directly to the main chain by a covalent bond, or incorporated in or pendant from a longer chain which is itself pendant from the main chain of the polymer), or both. This ethylenic unsaturation is provided by carrying out the condensation polymerization with one or more reactants which participate in the condensation polymerization reaction and which also contain ethylenic unsaturation. Under conventional condensation polymerization conditions the ethylenic unsaturation survives the condensation polymerization. Of the different types of reactants present (e.g., diacid, diol, anhydride, and so forth), the ethylenically unsaturated reactant can comprise all or a portion of one of the reactant types, or all or a portion of more than one of the reactant types.

Thus, for instance, the desired ethylenic unsaturation can be provided by incorporating into the reactant mixture an ethylenically unsaturated diacid, an ethylenically unsaturated anhydride (such as maleic anhydride), an ethylenically unsaturated diol, or mixtures of any two or more of such compounds. The properties desired of the final product produced by the process of the present invention are used to guide whether all, or a portion, of the diacid component will comprise an ethylenically unsaturated dicarboxylic acid and/or anhydride, and whether all, or a portion, of the diol component will comprise an ethylenically unsaturated diol compound.

It will be understood that the reactants present in the reaction mixture, which undergoes condensation polymerization in this aspect of the process of the present invention, can include one or more reactants customarily employed in the synthesis of such condensation polymers.

One reactant preferably employed in the desired condensation polymerization reaction is a diacid component by which is meant one or more dicarboxylic acids, one or more anhydrides of dicarboxylic acids, or mixtures thereof.

The dicarboxylic acids that can be used in the present invention include aliphatic dicarboxylic acids, alicyclic dicarboxylic acids, aromatic dicarboxylic acids, ethylenically unsaturated alkenyl dicarboxylic acids, or mixtures of two or more of any of these acids. Preferred are alkyl dicarboxylic diacids which generally will contain 4 to 36 carbon atoms, and aromatic dicarboxylic diacids which generally contain 9 to 20 carbon atoms. Examples of useful dicarboxylic acids include oxalic, malonic, dimethylmalonic, succinic, glutaric, adipic, trimethyladipic, pimelic, 2,2-dimethylglutaric, azelaic, sebacic, suberic, 1,3-cyclopentanedicarboxylic, 1,2-cyclohexanedicarboxylic, 1,3-cyclohexanedicarboxylic, 1,4-cyclohexanedicarboxylic, phthalic, terephthalic, isophthalic, tetrahydrophthalic, hexahydrophthalic, 2,5-norbornanedicarboxylic, 1,4-naphthalic, diphenic, 4,4'-oxydibenzoic, diglycolic, thiodipropionic, 4,4'-sulfonyldibenzoic, and 2,5-naphthalenedicarboxylic acids. Anhydrides of any of the foregoing are also contemplated.

Preferred difunctional dicarboxylic acids include isophthalic acid, terephthalic acid, phthalic acid, adipic acid, tetrachlorophthalic acid, pivalic acid, dodecanedioic acid, sebacic acid, azelaic acid, 1,4-cyclohexanedicarboxylic acid, 1,3-cyclohexanedicarboxylic acid, maleic acid, fumaric acid, succinic acid, 2,6-naphthalenedicarboxylic acid, glutaric acid, and any of the anhydrides thereof.

As indicated, the diacid component can comprise in whole or in part one or more ethylenically unsaturated polycarboxylic acids, especially dicarboxylic acids or their anhydrides, including but not limited to fumaric acid, maleic acid, mesaconic acid, citraconic acid, muconic acid (e.g. trans-trans muconic acid) and itaconic acid, and any anhydrides thereof, such as maleic anhydride. In general, the preferred ethylenically unsaturated dicarboxylic acids and anhydrides will contain 4 to 8 carbon atoms but may contain anywhere from 4 to 36 carbon atoms.

Diacids wherein the ethylenic unsaturation is pendant from the principle chain of the diacid are also contemplated within the scope of the present invention. Examples include any of the foregoing dicarboxylic acids and anhydrides having a pendant chain containing 2 to 8 carbon atoms at least two of which are connected by a carbon-carbon double bond, such as vinyl, propenyl, butenyl, and the like. One example is 2-vinyl-butane-1,4-dioic acid.

Diol compounds that can be used in the present invention include glycols, of which ethylene glycol is the preferred diol.

In cases where glycols in addition to, or instead of, ethylene glycol are utilized, it is preferable for them to contain from 3 to 10 carbon atoms. In cases where glycol ethers are utilized in conjunction with ethylene glycol in the diol component, it is preferable for them to contain from 4 to 10 carbon atoms. Some representative examples of glycols that can be used in conjunction with or instead of ethylene glycol include 1,3-propylene glycol, 1,2-propylene glycol, 2,2-diethyl-1,3-propanediol, 2,2-dimethyl-1,3-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-trimethyl-1,6-hexanediol, 2,4-dimethyl-2-ethylhexane-1,3-diol, 1,2-cyclohexanediol, 1,3-cyclohexanedimethanol, 1,4-cyclohexanedimethanol, p-xylenediol, and 2,2,4,4-tetramethyl-1,3-cyclobutanediol.

Polyols are also contemplated. Preferred polyols contain 3 or more hydroxyl groups and generally up to 8 carbon atoms. Examples include trimethylol propane, hexane-1,2,6-triol, butane-1,2,4-triol, trimethylolethane, pertaerythritol, quinitol, mannitol and sorbitol.

Preferred ethylenically unsaturated diol compounds contain 4 to 10 carbon atoms. Examples of such compounds include allyl diglycol, as well as any ethylenically unsaturated analogs of the exemplary glycols set forth hereinabove.

Included within the scope of ethylenically unsaturated diols useful in the process of the present invention are those wherein the ethylenic unsaturation is present in, or in a substituent pendant from, the chain connecting the two diol groups. Preferred examples include the mono-acrylates and mono-methacrylates of triols such as glycerol, wherein two hydroxyl groups remain available to cooperate in the formation of the polyester molecule. Other examples of satisfactory ethylenically unsaturated diols include 1,4-butenediol, 1,4-butynediol, glycerine allyl ether and glyceryl monostearate.

If branching is desirable, then it will be advantageous to use a branching agent in the condensation polymerization reaction. Such branching agents may contain three or more functional groups, and they preferably contain three or four functional groups. The reactive groups may be carboxyl or aliphatic hydroxyl. The branching agent may contain both types of groups. Examples of acidic branching agents include trimesic acid, trimellitic acid, pyromellitic acid, butanetetracarboxylic acid, naphthalene tricarboxylic acids and cyclohexane-1,3,5-tricarboxylic acid. Examples of hydroxy acid branching agents are 2,2-dihydroxymethyl propionic acid, 10,11-dihydroxy-undecanoic acid, and 5-(2-hydroxyethoxy)isophthalic acid. Generally from 0 to 3 percent of a polyol containing from 3 to 12 carbon atoms will be used as the branching agent (based upon the total diol component).

As indicated, condensation polymers useful in this invention also include bifunctional compounds such as hydroxyacids, which would be polymerized head-to-tail in known manner. Such reactants could include some ethylenically unsaturated compounds. Examples of such reactants include 6-hydroxy hexenedioic acid, and the like.

The acid component (which, as defined above, comprises one or more acids and/or anhydrides) and the one or more reactants destined to react with the acid or anhydride component are selected so that the reactants that enter into the condensation polymerization include a sufficient amount of ethylenic unsaturation so that the sulfonation which occurs at the ethylenically unsaturated sites provides a satisfactory degree of water dispersibility in the eventual polyurethane.

Thus, the amount of reactant bearing ethylenic unsaturation can comprise 1 mol. % to 50 mol. % of the reaction mixture. Generally, the unsaturated reactant(s) comprise about 1 mol. % to about 10 mol. % of the reaction mixture. The reactants are otherwise selected to be approximately equimolar in relationship to each other with the proviso that the component which carries the desired terminal hydroxyl group or groups of the polymer should be provided in stoichiometric excess. Thus, for instance, when reacting diols and diacids, to ensure that the polymer should be endcapped with hydroxyl terminal groups, an excess of the diol component should be supplied. It will be recognized that to ensure that the polymer is capped with the desired terminal groups, it may be necessary to provide in the reaction mixture more than simply a slight stoichiometric excess of the indicated component; the degree of excess is tempered, however, by the effect of that excess on the distribution of polymeric chain lengths formed by the condensation polymerization.

The reaction mixture is then subjected to condensation polymerization conditions effective to cause the reactants to react with each other to form the desired polyester. In general, effective condensation polymerization conditions are readily familiar to (and ascertainable by) the practitioner. It is preferred not to carry out the reaction in a solvent. However, if a solvent is desired, it should be high boiling (i.e. a boiling point above about 140° C.) Examples of suitable solvents include DMF (dimethylformamide), DMA (N,N-dimethylacetamide), xylene and DMSO.

Preferably, the reactant mixture for carrying out the condensation polymerization includes a small but effective amount such as up to about 0.02 wt. % of a catalyst for the polymerization. Useful catalytic compounds include protonic acids, tin compounds, titanium compounds and antimony compounds.

Typical condensation polymerization conditions are provided by exposing the reactants to temperatures on the order of about 150° C. to about 250° C. During the progress of the reaction, it is preferred to draw off water of condensation. To effectively carry out the desired condensation polymerization it is preferred to use nitrogen to purge the reaction mixture in order to carry out the water.

The chain lengths and molecular weights of the polymers that are useful and produced in the process of the present invention can fall within a rather wide range; typically, polyesters most useful in preparing polyurethanes as described herein will have a molecular weight in the range of about 500 to about 6,000. Thus, amounts and identities of the reactants can readily be tailored to achieve any desired molecular weight and molecular weight distribution.

At the end of the condensation polymerization, the product can be recovered and separated from the reaction mixture, or can be subjected to the sulfonation reaction in situ without first being recovered.

When the sulfonate functionality is added into the overall scheme at this point, sulfonation is carried out by reacting the ethylenically unsaturated polyester under appropriate sulfonating conditions with a sulfonating agent which comprises one or more bisulfites and/or one or more metabisulfites. Preferred sulfonating agents are the ammonium and alkali metal sulfites and alkali metal metabisulfites. The more preferred sulfonating agents are sodium bisulfite and sodium metabisulfite. Other preferred sulfonating agents include lithium bisulfite, lithium metabisulfite, potassium bisulfite, potassium metabisulfite, ammonium bisulfite and ammonium metabisulfite.

Sulfonation should be carried out using a stoichiometric excess of the sulfonating agent, calculated on the basis of the degree of ethylenic unsaturation present in the condensation polymer resulting from the foregoing condensation polymerization step. The sulfonation is preferably carried out in a suitable solvent such as water. Satisfactory sulfonation conditions include maintaining a temperature of about 10° C. to about 120° C. for a time on the order of 2–15 hours. The sulfonation also can be catalyzed by fine air bubbles purged through the reaction medium.

2. Forming the Polyester from Sulfonate-substituted Monomers

Another preferred technique for forming the sulfonate-substituted and hydroxyl-substituted polyester is to carry out the condensation polymerization reaction which forms the polyester from monomers which are already sulfonate-substituted.

One essential condition of this aspect of the present invention is that at least a portion, or all, of at least one of the difunctional monomeric reactants contains ethylenic unsaturation, that is, a carbon-carbon double bond, either in its main chain or pendant from its main chain.

In the first step of this aspect of the present invention, the ethylenically unsaturated monomeric precursor (e.g. diacid, anhydride, or diol) is sulfonated. Sulfonation is carried out by reacting the compound under appropriate sulfonating conditions with a sulfonating agent which comprises one or more bisulfites and/or one or more metabisulfites. Preferred sulfonating agents are the ammonium and alkali metal sulfites and alkali metal metabisulfites. Thus, the more preferred sulfonating agents are sodium bisulfite and sodium metabisulfite. Other preferred sulfonating agents include lithium bisulfite, lithium metabisulfite, potassium bisulfite, potassium metabisulfite, ammonium bisulfite and ammonium metabisulfite.

Sulfonation of the monomeric precursor should be carried out using a stoichiometric excess of the sulfonating agent. The sulfonation is preferably carried out in a suitable solvent such as water. Satisfactory sulfonation conditions include maintaining a temperature of about 10° C. to about 120° C. for a time on the order of 2–15 hours. The sulfonation also can be catalyzed by fine air bubbles purged through the reaction medium, or by any peroxides such as hydrogen peroxide, benzoyl peroxide, or t-butyl hydrogen peroxide.

Optionally, one may include in the reaction mixture of ethylenically unsaturated difunctional monomeric precursor and sulfonating agent, a second difunctional precursor reactant which enters into a condensation reaction with the ethylenically unsaturated monomeric precursor and endcaps it. If such another reactant is present, the reaction product is a sulfonated difunctional dimer which contains an amide, ether or ester linkage, depending on the chemical identity of the reactants and thus the nature of the endcapping reaction. Compounds suitable for use as the second difunctional precursor include compounds substituted with at least two groups selected from the group consisting of —OH and —COOH at least one of which can enter into a condensation reaction with the monomeric precursor. Examples include diacids and diols containing 2 to 8 carbon atoms, such as 1,6-hexanediol and 1,6-diaminohexane.

The desired ethylenic unsaturation is present as an ethylenically unsaturated diacid, an ethylenically unsaturated anhydride (such as maleic anhydride), or an ethylenically unsaturated diol, or mixtures of any two or more of such compounds. Also, ethylenically unsaturated compounds which contain nonidentical functional groups can be used.

The ethylenically unsaturated diacid component can comprise in whole or in part one or more ethylenically unsaturated polycarboxylic acids, especially dicarboxylic acids or their anhydrides, including but not limited to fumaric acid, maleic acid, mesaconic acid, citraconic acid, muconic acid (e.g. trans-trans muconic acid) and itaconic acid, and any anhydrides thereof, such as maleic anhydride. In general, the preferred ethylenically unsaturated dicarboxylic acids and anhydrides will contain 4 to 8 carbon atoms but may contain anywhere from 4 to 36 carbon atoms.

Diacids wherein the ethylenic unsaturation is pendant from the principal chain of the diacid are also contemplated within the scope of the present invention. Examples include any of the dicarboxylic acids disclosed herein, and their anhydrides, having a pendant chain containing 2 to 8 carbon atoms at least two of which are connected by a carbon-carbon double bond, such as vinyl, propenyl, butenyl, and the like. One example is 2-vinyl-butane-1,4-dioic acid.

Preferred ethylenically unsaturated diol components contain 4 to 10 carbon atoms. Examples of such compounds include allyl diglycol, as well as any ethylenically unsaturated analogs of the exemplary glycols set forth herein.

Included within the scope of ethylenically unsaturated diols useful in the process of the present invention are those wherein the ethylenic unsaturation is present in, or in a substituent pendant from, the chain connecting the two diol groups. Preferred examples include the mono-acrylates and mono-methacrylates of triols such as glycerol, wherein two hydroxyl groups remain available to cooperate in the formation of the polyester molecule. Other examples of satisfactory ethylenically unsaturated diols include 1,4-butenediol, 1,4-butynediol, glycerine allyl ether and glyceryl monostearate.

Whether or not the indicated optional reactant was also present, the product of this first step of the process of the present invention is a sulfonated product, at least di-substituted with groups selected from the group consisting of —OH and —COOH. This product is termed a monomeric precursor in that it has either no, or at most one, —C(O)O—linkage. This product must be capable of undergoing condensation polymerization with a suitable difunctional second monomer in the second step of this embodiment of the present invention.

The second step of this embodiment of the present invention can be carried out with any of a considerable number of reactants. The choice depends on the nature of the functional groups present, and in part on the properties desired of the eventual product.

One reactant preferably employed in the desired condensation polymerization reaction is a diacid component, by which is meant one or more dicarboxylic acids, one or more anhydrides of dicarboxylic acids, or mixtures thereof.

The dicarboxylic acids that can be used in the present invention include aliphatic dicarboxylic acids, alicyclic dicarboxylic acids, aromatic dicarboxylic acids, ethylenically unsaturated alkenyl dicarboxylic acids, or mixtures of two or more of these acids. Preferred are alkyl dicarboxylic diacids which generally will contain 4 to 36 carbon atoms, and aromatic dicarboxylic diacids which generally contain 9 to 20 carbon atoms. Examples of useful dicarboxylic acids include oxalic, malonic, dimethylmalonic, succinic, glutaric, adipic, trimethyladipic, pimelic, 2,2-dimethylglutaric, azelaic, sebacic, suberic, 1,3-cyclopentanedicarboxylic, 1,2-cyclohexanedicarboxylic, 1,3-cyclohexanedicarboxylic, 1,4-cyclohexanedicarboxylic, phthalic, terephthalic, isophthalic, tetrahydrophthalic, hexahydrophthalic, 2,5-norbornanedicarboxylic, 1,4-naphthalic, diphenic, 4,4'-oxydibenzoic, diglycolic, thiodipropionic, 4,4'-sulfonyldibenzoic, and 2,5-naphthalenedicarboxylic acids. Anhydrides of any of the foregoing are also contemplated.

Preferred difunctional dicarboxylic acids include isophthalic acid, terephthalic acid, phthalic acid, adipic acid, tetrachlorophthalic acid, pivalic acid, dodecanedioic acid, sebacic acid, azelaic acid, 1,4-cyclohexanedicarboxylic acid, 1,3-cyclohexanedicarboxylic acid, maleic acid, fumaric acid, succinic acid, 2,6-naphthalenedicarboxylic acid, glutaric acid, and any of the anhydrides thereof.

Diol compounds that can be used in the present invention include glycols, of which ethylene glycol is the preferred diol.

In cases where glycols in addition to, or instead of, ethylene glycol are utilized, it is preferable for them to contain from 3 to 10 carbon atoms. In cases where glycol ethers are utilized in conjunction with ethylene glycol in the diol component, it is preferable for them to contain from 4 to 10 carbon atoms. Some representative examples of glycols that can be used in conjunction with or instead of ethylene glycol include 1,3-propylene glycol, 1,2-propylene glycol, 2,2-diethyl-1,3-propanediol, 2,2-dimethyl-1,3-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-trimethyl-1,6-hexanediol, 2,4-dimethyl-2-ethylhexane-1,3-diol, 1,2-cyclohexanediol, 1,3-cyclohexanedimethanol, 1,4-cyclohexanedimethanol, p-xylenediol, and 2,2,4,4-tetramethyl-1,3-cyclobutanediol.

As the diol component, polyether glycols can also be used, such as polypropylene glycol having a molecular weight of 200 to 6,000 (examples of which include ("Rezol ED-1000" and "Rezol ED-2000", sold by Witco Corporation); polyethylene glycol having a molecular weight of 200 to 6,000 (examples of which include ("Rezol PEG-400" and "Rezol PEG-1000", sold by Witco Corporation); and block and random copolymers of propylene glycol and ethylene glycol, having a molecular weight of 200 to 6,000 (examples of which include "Rezol EPD-112", "Rezol EPD-225", "Rezol EPD-56", and "Rezol EPD-28" sold by Witco Corporation).

If branching is desirable, then it will be advantageous to use a branching agent in the condensation polymerization reaction. Such branching agents may contain three or more functional groups, and they preferably contain three or four functional groups. The reactive groups may be carboxyl or aliphatic hydroxyl. The branching agent may contain both types of groups. Examples of acidic branching agents include trimesic acid, trimellitic acid, pyromellitic acid, butanetetracarboxylic acid, naphthalene tricarboxylic acids and cyclohexane-1,3,5-tricarboxylic acid. Examples of hydroxyl branching agents (polyols) include glycerin, trimethylpropane, pentaerythritol, dipentaerythritol, 1,2,6-hexanetriol and 1,3,5-trimethylolbenzene. Examples of hydroxy acid branching agents are 2,2-dihydroxymethyl propionic acid, 10,11-dihydroxy--undecanoic acid, and 5-(2-hydroxyethoxy)isophthalic acid. Generally from 0 to 3 percent of a polyol containing from 3 to 12 carbon atoms will be used as the branching agent (based upon the total diol component).

As indicated, condensation polymers useful in this invention also include bifunctional compounds such as hydroxyacids, which are polymerized head-to-tail in known manner. Such reactants would have to include some ethylenically unsaturated compounds. Examples of such reactants include 6-hydroxy (or 6-amino) hexanedioic acid, and the like.

The acid component (which, as defined above, comprises one or more acids and/or anhydrides) and the one or more reactants destined to react with the acid or anhydride component are selected so that the reactants that enter into the condensation polymerization include a sufficient amount of sulfonation so that the sulfonated reaction product of the present invention provides a satisfactory degree of water dispersibility in the polymer.

Thus, the amount of sulfonated reactant can comprise 1 mol. % to 50 mol. % of the reaction mixture in the second step of the process. Generally, the sulfonated reactant(s) comprise about 1 mol. % to about 10 mol. % of the reaction mixture. The reactants are otherwise selected to be approximately equimolar in relationship to each other with the proviso that the component which carries the substituent group identical to the desired terminal group or groups of the polymer should be provided in stoichiometric excess.

Thus, since it is desired that the polyester should be endcapped with hydroxyl terminal groups, then an excess of the diol component should be supplied. It will be recognized that to ensure that the polymer is capped with the desired terminal hydroxyl groups, it may be necessary to provide in the reaction mixture more than simply a slight stoichiometric excess of the indicated component; the degree of excess is tempered, however, by the effect of that excess on the distribution of polymeric chain lengths formed by the condensation polymerization.

The reaction mixture is then subjected to condensation polymerization conditions effective to cause the reactants to react with each other to form the desired condensation polymers. In general, effective condensation polymerization conditions are readily familiar to (and ascertainable by) the practitioner. It is preferred not to carry out the reaction in a solution. However, if a solvent is desired, it should be high boiling (i.e. a boiling point above about 140° C.) Examples of suitable solvents include DMF (dimethylformamide), DMA (N,N-dimethylacetamide), xylene and DMSO.

Preferably, the reactant mixture for carrying out the condensation polymerization includes a small but effective amount such as up to about 0.02 wt. % of a catalyst for the polymerization. Useful catalytic compounds include protonic acids, tin compounds, titanium compounds and antimony compounds.

Typical condensation polymerization conditions are provided by exposing the reactants to temperatures on the order of about 150° C. to about 250° C. During the progress of the reaction, it is preferred to draw off water of condensation. To effectively carry out the desired condensation polymerization it is preferred to use nitrogen to purge the reaction mixture in order to carry out the water.

The chain length or molecular weight of the polymers that are useful and produced in the process of the present invention can fall within a rather wide range; typically, useful polymers will have a molecular weight in the range of about 200 to about 50,000. Thus, amounts and identities of the reactants can readily be tailored to achieve any desired molecular weight and distribution.

At the end of the condensation polymerization, the product can be recovered and separated from the reaction mixture.

This aspect of the present invention affords several significant advantages compared to other processes for producing water-dispersible sulfonated polymers. In particular, each of the foregoing steps can be carried out under relatively mild conditions and are not particularly constrained by the choice of reactants. In particular, a much greater freedom in choice of reactants is provided, as the reactants in the condensation polymerization step can be polymerized under relatively straightforward condensation polymerization conditions and the sulfonation step can be carried out under fairly conventional sulfonation conditions. This freedom in the choice of reactants is an advantage in that it affords greater range in the tailoring of the properties of the final, water-dispersible sulfonated, hydroxyl-terminated polyester that is produced.

B. Formation of Sulfonate-Substituted Prepolymers

The sulfonate-substituted polyesters made by the foregoing description are useful in synthesizing polyurethane polymers. Preferably, the sulfonate-substitute polyesters used in polyurethane synthesis are polyesters which are made (as described above) using a coreactant containing two or more hydroxyl groups so that the sulfonate-substituted polyester contains unreacted hydroxyl groups.

There should be an average of at least 2 hydroxyl groups per mole of sulfonate-substituted polyester. More preferably, the hydroxyl substitution corresponds to at least 2 hydroxyls per molecule of polymer; or a hydroxyl number of at least about 15, preferably in the range of about 25 to about 225. The hydroxyl number is defined as the number of milligrams of potassium hydroxide equivalent to the hydroxyl content of the sample. To determine a hydroxyl number, the material is reacted with acetic anyhydride in pyridine and the excess anhydride is hydrolyzed and titrated. The hydroxyl number is calculated from the amount of reagent consumed. One equivalent of hydroxyl uses one equivalent of anhydride.

The sulfonate-substituted polyester used in polyurethane synthesis preferably has a molecular weight of about 500 to about 6,000 to function satisfactorily as a segment (in polymer technology, the "soft segment") of the eventual polyurethane. Those practitioners familiar with this chemical field can readily select reactants and reaction conditions which are effective to prepare polymers having a molecular weight desired for further use in the synthesis of polyurethanes.

Then, the sulfonate-substituted polyester is reacted with one or more polyisocyanates, preferably one or more diisocyanates, and with one or more chain extenders, to produce the desired polyurethane.

Any organic polyisocyanates may be used in the process according to the invention. It is preferred to use polyisocyanates of the formula $Q(NCO)_2$ wherein Q represents an aliphatic hydrocarbon group containing from 4 to 12 carbon atoms, a cycloaliphatic hydrocarbon group containing from 6 to 15 carbon atoms, an aromatic hydrocarbon group containing from 6 to 15 carbon atoms or an araliphatic hydrocarbon group containing from 7 to 15 carbon atoms. The most preferred diisocyanate is isophorone diisocyanate. The following are examples of other preferred diisocyanates: tetramethylene-diisocyanate, hexamethylene diisocyanate, dodecamethylene-diisocyanate, 1,4-diisocyanato-cyclohexane, 1-isocyanato-3,3,5-trimethyl-5-isocyanatomethyl cyclohexane, 4,4'-diisocyanatodicyclohexylemethane, 4,4'-diisocyanatodicyclohexyl-propane-(2,2); 1,4-diisocyanato-benzene, 2,4-diiocyanatotoluene, 2,6-diisocyanatotoluene, 4,4'-diisocyanatodiphenylmethane, 4,4'-diisocyanatodiphenylpropane-(2,2), p-xylylene-diisocyanate, a,a,a',a'-tetramethyl-m-or p-xylylene-diisocyanate and mixtures of these compounds. Mixtures of any of the foregoing can also be used. The mole ratio of diisocyanate to polyester is generally stoichiometric, e.g. (1.9–2.1):1.

The reaction of the hydroxyl-substituted ("polyol") polyester with the diisocyanate can optionally be carried out in the presence of a comonomer such as a lower diol containing 2 to 10 carbon atoms. Typical amounts of such a comonomer are up to about 10 wt. % of the amount of all reactants present.

Reaction of the diisocyanate and the polyol polymer can be carried out at moderately elevated temperatures, e.g. 50° C.–100° C. The reaction is generally carried out in an inert solvent or without a solvent. One preferred solvent is N-methyl pyrrolidone. Other suitable solvents include acetone, methyl ethyl ketone, toluene, dimethyl formamide, ethyl acetate, tetrahydro furan, and dioxane.

C. Chain Extending the Prepolymer

The polymeric isocyanate-dicapped product of the reaction with the diisocyanate is next reacted with a suitable chain extender, preferably dispersed in water. Satisfactory chain extenders include diamines such as hydrazine, and alkyl and aromatic polyols, especially diols, and alkyl and aromatic diamines and triamines, wherein the alkyl compounds contain a total of 2 to 12 carbon atoms or the aromatic moiety contains 6 to 10 carbon atoms. Other examples of chain extenders include ethylene diamine, diethylene triamine, 1,2-diaminopropane, 1,3-diaminopropane, 1,4-diaminobutane, and 3,3,5-trimethyl-5-aminomethyl cyclohexylamine; and ethylene glycol, 1,2-dihydroxypropane, 1,6-dihydroxyhexane, and the polyols described herein as useful reactants to make the polyester.

The product of reaction with the chain extender is a dispersion of polymeric polyurethane particles. This dispersion can be dissolved or suspended in a suitable vehicle for application as a coating or film, or for compounding into any of the large variety of industrial and domestic products which can be fabricated from polyurethanes.

The invention will be described further in the following examples. These examples are intended for illustrative purposes, and are not intended to limit the scope of applicants' invention.

Examples 1 and 2 illustrate preparation of sulfonate-substituted polyester by preparation of an ethylenically unsaturated polyester which is then sulfonated.

EXAMPLE 1

Sulfonation of Ethylenically Unsaturated Polyester Terminated with Hydroxyl Groups

| Raw Materials: | |
| --- | --- |
| 1,4-Butanediol | 857 grams |
| 1,6-Hexanediol | 1,124 grams |
| Adipic Acid | 2,074 grams |
| Maleia Anhydride | 155 grams |
| Total Load | 4,210 grams |
| Organotin Catalyst | 0.30 grams |
| Water to distill | 540 grams |
| Theoretical Yield | 3,670 grams |
| Sodium Bisulfite | 162 grams |
| Water | 379 grams |

Procedure

A four neck glass flask, equipped with a nitrogen inlet, a stirrer, a column, and a thermometer, was charged with catalyst, 1,4-butanediol, 1,6-hexanediol, and maleic anhydride, and the contents were heated to approximately 80° C. Adipic acid was added at an appropriate rate for the reaction to proceed under control. The temperature was increased to 225° C., while the column was kept hot using steam. The nitrogen and agitation were increased, as the reaction proceeded, to facilitate the water removal, but not rapid enough to expel the glycol.

The hydroxyl value and acid number were checked as needed and the loss of glycol during the reaction was adjusted to reach the theoretical hydroxyl value. Reaction was considered complete when the hydroxyl number and the acid number reached the expected values.

The reactor contents were then cooled to 85° C. The column was replaced with a water condenser and nitrogen was shut off. A clear water solution of sodium bisulfite was added under constant agitation, and the temperature was maintained at 75 to 80° C. for 8 hours. Vacuum was then applied in order to strip the water, and reaction was considered complete when the percent moisture value reached the desired result. The final product had a hydroxyl number of 93.6, an acid number of 0.65, a moisture content of 0.06%, a viscosity at 40° of 16,300 cps, an active anionic group of 0.344 meq/g, and a sulfonation conversion of 88.3%. The polymer, a sulfonated polyester, was dispersed in water very easily, and the dispersed polyester demonstrated good stability.

EXAMPLE 2

Sulfonation of Ethylenically Unsaturated Polyester Terminated with Dihydroxyl Groups

| Raw Materials: | |
| --- | --- |
| Ethylene Glycol | 1,187 grams |
| Adipic Acid | 2,163 grams |
| Maleic Anhydride | 156 grams |
| Total Load | 3,506 grams |
| Organotin Catalyst | 0.30 grams |
| Water to Distill | 562 grams |
| Theoretical Yield | 2,936 grams |
| Sodium Bisulfite | 165 grams |
| Water | 660 grams |

Procedure

A four neck glass flask, equipped with a nitrogen inlet, a stirrer, a column, and a thermometer, was charged with catalyst, ethylene glycol, and maleic anhydride and heated to approximately 80° C. Adipic acid was added at an appropriate rate for the reaction to proceed under control. The temperature was increased to 225° C., while the column was kept hot using steam. The nitrogen and agitation were increased, as the reaction proceeded, to facilitate the water removal, but not rapid enough to expel the glycol.

The hydroxyl value and acid number were checked as needed, and the loss of glycol during the reaction was adjusted to reach the theoretical hydroxy value. Reaction was considered complete when the hydroxyl number and the acid number reached the expected values.

The reactor contents were then cooled to 85° C. The column was replaced with a water condenser, and nitrogen was shut off. A clear water solution of sodium bisulfite was added under constant agitation, and the temperature was maintained at 75 to 80° C. for 8 hours. Vacuum was then applied in order to strip the water, and reaction was considered complete when the percent moisture value reached the desired result. The final product had a hydroxyl number of 96.6, an acid number of 1.00, and a moisture content of 0.08%. The polymer, a sulfonated polyester, was dispersed in water very easily, and the dispersed polyester demonstrated good stability.

Examples 3–6 illustrate the formation of water-dispersible polyurethanes employing as one reactant sulfonate-substituted polyester which had been prepared by sulfonation of an ethylenically unsaturated polyester in a manner analogous to that shown in Examples 1 and 2.

EXAMPLE 3

A water dispersible polyurethane was prepared from sodium sulfonate-grafted poly(butylene/hexamethylene adipate) glycol with a molecular weight of 1,200 and a hydroxyl number of 95.

| RAW MATERIAL | | |
|---|---:|---|
| 1. NCO-Terminated Prepolymer | | |
| IPDI (Isophorone diisocyanate) | 198.6 | grams |
| sulfonate-grafted polyester, OH no. = 95 | 589.2 | grams |
| N-methylpyrrolidone ("NMP") | 200.0 | grams |
| 2. Dispersion | | |
| NCO-terminated prepolymer | 900.0 | grams |
| Water | 1,510.0 | grams |
| Hydrazine (54.4%) | 15.9 | grams |

Procedure

The polyester and the NMP were added to a reaction kettle and dehydrated by a vacuum pump at 100° C. with stirring for 30 minutes. The mixture was then cooled to 80° C. and the diisocyanate was added. Stirring was continued at 80° C. until the theoretical isocyanate content was reached (about 5 hours). The resulting prepolymer at a temperature of 80° C. was dispersed in the solution of hydrazine in water at a temperature of 25° C. Stirring was continued for 4 hours. The reaction mixture was cooled to room temperature and filled into containers through a 200 micron sieve.

The product was a fine dispersion which had a particle size of 60 nm and a solids content of 30%. The pH of the dispersion was 7.5. A dry film was formed from this dispersion which had a tensile strength of 2,200 psi, a 100% modulus of 185 psi, a 200% modulus of 225 psi, a 300% modulus of 270 psi, and an elongation of 650%.

EXAMPLE 4

A water dispersible polyurethane was prepared from sodium sulfonate-grafted poly(butylene adipate) glycol with a molecular weight of 1,200 and a hydroxyl number of 95.

| RAW MATERIAL | | |
|---|---:|---|
| 1. NCO-Terminated Prepolymer | | |
| IPDI (Isophorone diisocyanate) | 225.5 | grams |
| Sulfonate-grafted polyester OH no. = 95 | 574.1 | grams |
| 1,4-Butanediol | 12.2 | grams |
| NMP | 90.0 | grams |
| 2. Dispersion | | |
| NCO-terminated prepolymer | 810.0 | grams |
| Water | 1,630.0 | grams |
| Hydrazine (35%) | 28.6 | grams |

Procedure

The polyester, 1,4-butanediol, and NMP were added to a reaction kettle and dehydrated by a vacuum pump at 100° C. with stirring for 30 minutes. The mixture was then cooled to 80° C. and the diisocyanate was added. Stirring was continued at 80° C. until the theoretical isocyanate content was reached (about 5 hours). The prepolymer at a temperature of 80° C. was dispersed in the aqueous hydrazine solution at a temperature of 25° C. Stirring was continued for 4 hours. The reaction mixture was cooled to room temperature and filled into containers through a 200-micron sieve.

The product was a fine dispersion which had a particle size of 35 nm and a solids content of 30%. The pH of the dispersion was 7.2. A dry film formed from this dispersion had a tensile of 30%. The pH of the dispersion was 7.2. A dry film formed from this dispersion had a tensile strength of 1,250 psi, a 100% modulus of 183 psi, a 200% modulus of 206 psi, a 300% modulus of 226 psi, and an elongation of 800%.

EXAMPLE 5

A water dispersible polyurethane was prepared from sodium sulfonate-grafted poly(ethylene adipate) glycol with a molecular weight of 1,200 and a hydroxyl number of 95.

| RAW MATERIAL | | |
|---|---:|---|
| 1. NCO-Terminated Prepolymer | | |
| IPDI (Isophorone diisocyanate) | 223.3 | grams |
| Sulfonate-grafted polyester, OH no. = 95 | 574.6 | grams |
| 1,4-Butanediol | 12.2 | grams |
| NMP | 90.0 | grams |
| 2. Dispersion | | |
| NCO-terminated prepolymer | 810.0 | grams |
| Water | 1,628.0 | grams |
| Hydrazine (35%) | 26.6 | grams |

Procedure

The polyester, 1,4-butanediol, and NMP were added to a reaction kettle and dehydrated by a vacuum pump at 100° C. with stirring for 30 minutes. The mixture was then cooled to 80° C. and the diisocyanate was added. Stirring was continued at 80° C. until the theoretical isocyanate content was reached (about 5 hours). The prepolymer at a temperature of 80° C. was dispersed in the aqueous hydrazine solution at a temperature of 25° C. Stirring was continued for 4 hours. The reaction mixture was cooled to room temperature and filled into containers through a 200-micron sieve.

The product was a fine dispersion which had a particle size of 37 nm and a solids content of 30%. The pH of the dispersion was 7.7. A dry film formed from this dispersion had a tensile strength of 3,309 psi, a 100% modulus of 223 psi, a 200% modulus of 278 psi, a 300% modulus of 358 psi, and an elongation of 730%.

EXAMPLE 6

A water dispersible polyurethane was prepared from sodium sulfonate-grafted poly(butylene/hexamethylene adipate) glycol with a molecular weight of 1,100 and a hydroxyl number of 100.

| RAW MATERIAL | |
|---|---|
| 1. NCO-Terminated Prepolymer | |
| IPDI (Isophorone diisocyanate) | 243.7 grams |
| Sulfonate-grafted polyester, OH no. = 95 | 592.3 grams |
| 1,4 -Butanediol | 8.4 grams |
| NMP | 55.5 grams |
| 2. Dispersion | |
| NCO-terminated prepolymer | 810.0 grams |
| Water | 1,738.0 grams |
| Hydrazine (35%) | 34.6 grams |

Procedure

The polyester, 1,4-butanediol, and NMP were added to a reaction kettle and dehydrated by a vacuum pump at 100° C. with stirring for 30 minutes. The mixture was then cooled to 80° C. and the diisocyanate was added. Stirring was continued at 80° C. until the theoretical isocyanate content was reached (about 5 hours). The prepolymer at a temperature of 80° C. was dispersed in the aqueous hydrazine solution at a temperature of 25° C. Stirring was continued for 4 hours. The reaction mixture was cooled to room temperature and filled into containers through a 200-micron sieve.

The product was a fine dispersion which had a particle size of 60 nm and a solids content of 30%. The pH of the dispersion was 7.4. A dry film formed from this dispersion had a tensile strength of 8,978 psi, a 100% modulus of 1,410 psi, a 300% modulus of 5,744 psi, and an elongation of 400%.

Examples 7 through 10 illustrate the preparation of sulfonate-substituted polyester via polymerization of sulfonated monomer, and its use in the preparation of polyurethane.

EXAMPLE 7

A. Preparation of adduct (50%) [2-(sodiosulfo)-1,4-butanedioic acid]

| RAW MATERIAL | |
|---|---|
| Maleic Anhydride | 111.4 grams |
| Water | 270.5 grams |
| Sodium Bisulfite | 118.2 grams |

Procedure

A four neck glass flask, equipped with a nitrogen inlet, a stirrer, a water condenser, and a thermometer, was charged with maleic anhydride. A clear water solution of sodium bisulfite was added under constant agitation and the temperature was maintained at 75–80° C. for four hours. The conversion of sulfonation was 100%, and the solid content was 50%.

B. Preparation of sodium sulfonate-containing polyester

| RAW MATERIAL | |
|---|---|
| 1,6 -Hexanediol | 997 grams |
| Neopentyl Glycol (90%) | 853 grams |
| Product of step A | 1,017 grams |

-continued

| RAW MATERIAL | |
|---|---|
| (as 50 wt. % aqueous solution) | |
| Adipic Acid | 1,821 grams |
| Total Load | 4,688 grams |
| Organotin Catalyst | 0.30 grams |
| Water to distill | 1,156 grams |
| Theoretical Yield | 3,532 grams |

Procedure

A four neck glass flask, equipped with a nitrogen inlet, a stirrer, a column, and a thermometer, was charged with catalyst, 1,6-hexanediol, neopentyl glycol, a 50 wt. % solution of the product of step A, and adipic acid. The temperature was increased to 150° C.+/−5°, while the column was kept hot using steam. The nitrogen and agitation were increased, as the reaction proceeded, to facilitate the water removal, but not rapid enough to blow out the glycol.

Hydroxyl value and acid number were checked as needed and the loss of glycol during the reaction was adjusted to reach the theoretical hydroxyl value. Reaction was considered complete when the hydroxyl number and the acid number reached the expected values. The final sodium sulfonate-containing polyester had a hydroxyl number of 108, and an acid number of 3.0. The polymer, a sulfonate polyester, dispersed in water very easily, and demonstrated good stability.

EXAMPLE 8

A water dispersible polyurethane was prepared from sodium sulfonate-grafted poly(hexamethylene/neopentyl adipate) glycol, obtained via polymerization of sulfonated monomer, with a molecular weight of 1,040 and a hydroxyl number of 108 prepared according to Example 7.

| RAW MATERIAL | |
|---|---|
| 1. NCO-Terminated Prepolymer | |
| IPDI (Isophorone diisocyanate) | 77.69 grams |
| Sulfonated-grafted Polyester, OH no. = 108 | 243.3 grams |
| N-methylpyrrolidone ("NMP") | 80.0 grams |
| 2. Dispersion | |
| NCO-terminated prepolymer | 400 grams |
| Water | 669 grams |

Procedure

The polyester and the NMP were added to a reaction kettle and dehydrated by a vacuum pump at 100° C. with stirring for 30 minutes. The mixture was then cooled to 80° C. until the theoretical isocyanate content was reached. The resulting prepolymer at a temperature of 80° C. was dispersed in water at a temperature of 25° C. Stirring was continued for 4 hours. The reaction mixture was cooled to room temperature and filled into containers through a 200 micron sieve.

The product was a fine dispersion and had a solid content of about 30%. The dispersion was very stable: under heat aging at 52° C. in an oven for 1 month, no phase separation or gellation were found.

EXAMPLE 9

A. Preparation of Adduct [half ester from one mole of maleic anhydride and one mole of 1,4-butanediol]

| RAW MATERIAL | |
|---|---|
| 1,4-Butanediol | 670 grams |
| Maleic Anhydride | 730 grams |
| Total Load | 1,400 grams |
| Theoretical Yield | 1,400 grams |
| Sodium Bisulfite | 758 grams |
| Water | 2,158 grams |

Procedure

A four neck glass flask, equipped with a nitrogen inlet, a stirrer, a water condenser, and a thermometer, was charged with 1,4-butanediol, and maleic anhydride (the molar ratio of 1,4-butanediol to maleic anhydride was 1/1), and heated to approximately 80° C. After two hours, a clear water solution of sodium bisulfite was added under constant agitation and the temperature was maintained at 75–80° C. for eight hours. The conversion of sulfonation was 100%, the solid content was 50%, and the pH of the aqueous solution was 3.0.

B. Preparation of sodium sulfonate-containing polyester.

| RAW MATERIAL | |
|---|---|
| 1,4-Butanediol | 1,662 grams |
| Product of step A. of Ex. 6 (as 50 wt. % aqueous solution) | 631 grams |
| Adipia Acid | 2,294 grams |
| Total Load | 4,587 grams |
| Organotin Catalyst | 0.30 grams |
| Water to distill | 900 grams |
| Theoretical Yield | 3,600 grams |

Procedure

A four neck glass flask, equipped with a nitrogen inlet, a stirrer, a column, and a thermometer, was charge with catalyst, 1,4-butanediol, a 50 st. % aqueous solution of the product was increased to 150° C.+/−5°, while the column was kept hot using steam. The nitrogen and agitation were increased, as the reaction proceeded, to facilitate the water removal, but not rapid enough to blow out the glycol.

Hydroxyl value and acid number were checked as needed and the loss of glycol during the reaction was adjusted to reach the theoretical hydroxyl value. Reaction was considered complete when the hydroxyl number and the acid number reached the expected values. The final sodium sulfonate-containing polyester had a hydroxyl number of 63.4, an acid number of 2.2. The polymer, a sulfonate polyester, dispersed in water very easily, and the dispersed polyester demonstrated good stability.

EXAMPLE 10

A water dispersible polyurethane was prepared from sodium sulfonate-grafted poly(butylene adipate) glycol, obtained via polymerization of sulfonated monomer, with a molecular weight of 1,750 and a hydroxyl number of 64.

| RAW MATERIAL | |
|---|---|
| 1. NCO-Terminated Prepolymer | |
| IPDI (Isophorone diisocyanate) | 19.68 grams |
| HDI (Hexamethylene diisocyanate) | 29.51 grams |
| Sulfonate-grafted Polyester, OH no. = 64 | 154.16 grams |
| Dimethylolpropionic acid ("DMPA") | 15.64 grams |
| N-methylpyrrolidone ("NMP") | 51.7 grams |
| Triethylamine ("TEA") | 4.95 grams |
| 2. Dispersion | |
| NCO-terminated prepolymer | 275.64 grams |
| Water | 495 grams |

Procedure

The polyester and the DMPA and the NMP were added to a reaction kettle and dehydrated by a vacuum pump at 100° C. with stirring for 30 minutes. The mixture was then cooled to 80° C. until the theoretical isocyanate content was reached. The resulting prepolymer at a temperature of 80° C., and the HDI and IPDI were added. After 1 hour, the TEA was added. Stirring was continued at 80° C. until the theoretical isocyanate content was reached. The resulting prepolymer, at a temperature of 80° C., was dispersed in water at a temperature of 25° C. Stirring was continued for 4 hours. The reaction mixture was cooled to room temperature and filled into containers through a 200 micron sieve.

The product was a fine dispersion which had a particle size of 195 nm and a solid content of about 30%. The dispersion was very stable under heat aging; in a 52° C. oven for 1 month, no phase separation or gellation were found.

What is claimed is:

1. A process for producing a water-dispersible polyurethane comprising:
   (a) providing a sulfonate-substituted polyester which is substituted with an average of at least two hydroxyl groups per molecule wherein said sulfonated-substituted polyester is formed by:
      forming an ethylenically unsaturated polyester which is substituted with at least two hydroxyl groups by condensation polymerization of an ethylenically unsaturated diol with a diacid or anhydride; and
      sulfonating said ethylenically unsaturated polyester by reacting it with a sulfonating agent under conditions such that said sulfonating agent reacts with said ethylenic unsaturation and sulfonates said polyesters;
   (b) reacting said sulfonate-substituted polyester with one or more polyisocyanate compounds to form a sulfonate-substituted prepolymer substituted with at least two isocyanate groups; and
   (c) reacting said prepolymer with one or more chain extenders free of salt-forming groups, wherein said one or more chain extenders are selected from the group consisting of hydrazine, alkyl and aromatic polyols, and alkyl and aromatic diamines and triamines, wherein the alkyl compounds contain a total of 2 to 12 carbon atoms and the aromatic compounds contain 6 to 10 carbon atoms, thereby forming a polyurethane, wherein said polyester is sufficiently sulfonate-substituted so that said polyurethane is water-dispersible.

2. A process according to claim 1 wherein said polyester has a molecular weight of 500 to 6,000.

3. A process according to claim 1 wherein said diol contains 4 to 10 carbon atoms.

4. A process according to claim 1 wherein said diacid or anhydride contains 4 to 36 carbon atoms.

5. A process according to claim 4 wherein said diacid or anhydride contains 4 to 8 carbon atoms.

6. A process according to claim 1 wherein said diol is reacted with maleic anhydride.

7. A process according to claim 1 wherein said diol is selected from the group consisting of alkyl diols containing 2 to 6 carbon atoms.

8. A process according to claim 2 wherein said polyisocyanate is selected from the group consisting of compounds of the formula $Q(NCO)_2$ wherein Q is an aliphatic hydrocarbon group containing 4 to 12 carbon atoms, a cycloaliphatic group containing 6 to 15 carbon atoms, an aromatic hydrocarbon group containing 6 to 15 carbon atoms, or an araliphatic hydrocarbon group containing 7 to 15 carbon atoms.

9. A process according to claim 1 wherein said polyisocyanate is isophorone diisocyanate.

10. A process according to claim 1 wherein the chain extender is hydrazine.

11. A process for producing a water-dispersible polyurethane comprising:
  (a) providing a water-dispersible, sulfonate-substituted polyester which is substituted with an average of at least two hydroxyl groups per molecule wherein said sulfonate-substituted polyester is formed by reacting a sulfonate-substituted diol with maleic anhydride under conditions wherein said diol and said maleic anhydride undergo condensation polymerization to form said polyester;
  (b) reacting said sulfonate-substituted polyester with one or more polyisocyanate compounds to form a sulfonate-substituted prepolymer substituted with at least two isocyanate groups; and
  (c) reacting said prepolymer with one or more chain extenders free of salt-forming groups, thereby forming a polyurethane, wherein said polyester is sufficiently sulfonate-substituted so that said polyurethane is water-dispersible;
  wherein said one or more chain extenders are selected from the group consisting of hydrazine, alkyl polyols, aromatic polyols, alkyl diamines, aromatic diamines, alkyl triamines and aromatic triamines, wherein said alkyl compounds contain a total of 2 to 12 carbon atoms and said aromatic compounds contain 6 to 10 carbon atoms.

12. A process according to claim 11 wherein said polyester has a molecular weight of 500 to 6,000.

13. A process according to claim 11 wherein said diol contains 4 to 10 carbon atoms.

14. A process according to claim 11 wherein said diol is selected from the group consisting of alkyl diols containing 2 to 6 carbon atoms.

15. A process according to claim 11 wherein said polyisocyanate is selected from the group consisting of compounds of the formula $Q(NCO)_2$ wherein Q is an aliphatic hydrocarbon group containing 4 to 12 carbon atoms, a cycloaliphatic group containing 6 to 15 carbon atoms, an aromatic hydrocarbon group containing 6 to 15 carbon atoms, or an araliphatic hydrocarbon group containing 7 to 15 carbon atoms.

16. A process according to claim 11 wherein said polyisocyanate is isophorone diisocyanate.

17. A process according to claim 11 wherein the chain extender is hydrazine.

18. A process for producing a water-dispersible polyurethane comprising:
  (a) contacting a sulfonate-substituted ethylenically unsaturated monomeric precursor having non-identical difunctionality, with a difunctional comonomer capable of undergoing condensation polymerization with said monomeric precursor, under conditions whereunder said monomeric precursor and said comonomer undergo condensation polymerization to form a sulfonate-substituted polyester;
  (b) contacting said sulfonate-substituted polyester with one or more polyisocyanate compounds to form a sulfonate-substituted prepolymer substituted with at least two isocyanate groups; and
  (c) contacting said prepolymer with one or more chain extenders free of salt-forming groups, thereby forming a water-dispersible polyurethane.

19. The process of claim 18 wherein said ethylenically unsaturated monomeric precursor having non-identical difunctionality is a half ester obtained by contacting an ethylenically unsaturated diacid or ethylenically unsaturated anhydride with a diol in amounts sufficient to form said half ester.

20. The process of claim 19 wherein said half ester is contacted with a sulfonating agent to form said sulfonate-substituted ethylenically unsaturated monomeric precursor.

21. The process of claim 19 wherein said half ester comprises no more than one —C(O)O linkage and has non-identical functionality comprised of no more than one —COOH group and no more than one —OH group.

22. The process of claim 20 wherein said half ester is obtained by contacting an ethylenically unsaturated anhydride and a diol in substantially equimolar amounts.

23. The process of claim 20 wherein said anhydride is maleic anhydride.

24. The process of claim 20 wherein said diol is a butane diol or hexane diol.

25. A process for producing a water-dispersible polyurethane comprising:
  (a) contacting an ethylenically unsaturated anhydride with a diol in substantially equimolar amounts to form an ethylenically unsaturated half ester having no more than one C(O)O linkage and non-identical difunctionality comprised of no more than one —COOH group and no more than one —OH group;
  (b) contacting said ethylenically unsaturated half ester with a sulfonating agent to form a sulfonate-substituted half ester;
  (c) contacting said sulfonate-substituted half ester with a diacid and a diol under conditions whereunder said sulfonate-substituted half ester, said diacid and said diol form a sulfonate-substituted polyester that is substituted with an average of at least two hydroxyl groups per molecule;
  (d) contacting said sulfonate-substituted polyester with one or more polyisocyanate compounds to form a sulfonate substituted prepolymer substituted with at least two isocyanate groups; and
  (e) contacting said prepolymer with one or more chain extenders free of salt-forming groups to form a water-dispersible polyurethane.

26. The process of claim 25 wherein in step (a) said anhydride is maliec anhydride and said diol is a butane diol; in step (b) said sulfonating agent is an alkali metal bisulfite; and in step (c) said diacid is adipic acid and said diol is a butane diol.

* * * * *

UNITED STATES PATENT AND TRADEMARK OFFICE
CERTIFICATE OF CORRECTION

PATENT NO.   : 6,166,165
DATED        : December 26, 2000
INVENTOR(S)  : Wally Chang It is certified that error appears in the above-identified patent and that said Letters Patent is hereby corrected as shown below:

Column 11,
Line 58, "Maleia" should read -- Maleic --

Column 17,
Line 47, "50 st." should read -- 50 wt. --

Column 19,
Line 8, "claim 2" should read -- claim 1 --

Column 20,
Line 60, "maliec" should read -- maleic --

Signed and Sealed this

Twenty-eighth Day of May, 2002

JAMES E. ROGAN
Director of the United States Patent and Trademark Office

Attest:

Attesting Officer